Figure 1:
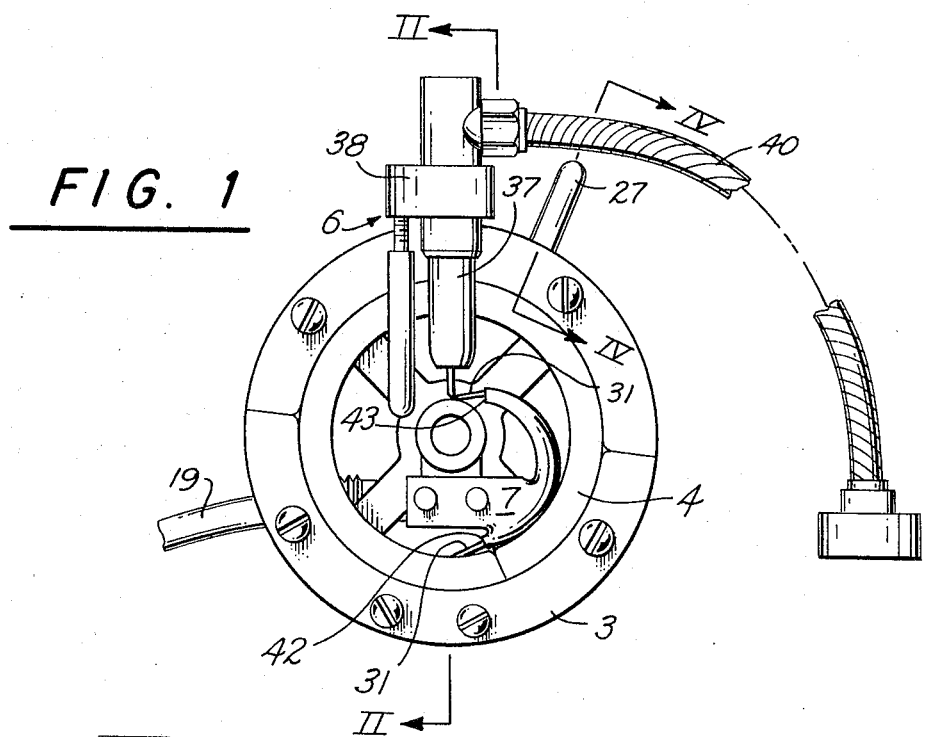

Jan. 17, 1967 L. TINNES 3,299,245
AUTOMATIC PIPE WELDING WIRE-FEED APPARATUS
Filed March 25, 1964 2 Sheets-Sheet 1

INVENTOR.
LEROY (NMI) TINNES
BY
ATTORNEYS

Jan. 17, 1967 L. TINNES 3,299,245
AUTOMATIC PIPE WELDING WIRE-FEED APPARATUS
Filed March 25, 1964 2 Sheets-Sheet 2

INVENTOR.
LEROY (NMI) TINNES
BY
ATTORNEYS

United States Patent Office 3,299,245
Patented Jan. 17, 1967

3,299,245
AUTOMATIC PIPE WELDING WIRE-FEED
APPARATUS
Leroy Tinnes, 744 Ohio St., Vallejo, Calif. 94590
Filed Mar. 25, 1964, Ser. No. 354,804
6 Claims. (Cl. 219—60)

The invention described herein may be manufactured and used by or for the Government of the United States of America for governmental purposes without the payment of any royalties thereon or therefor.

The present invention relates to a pipe welding apparatus and, in particular, to automatic welding apparatus of a type capable of being mounted on a length of pipe for making butt welds. The invention is a continuation-in-part of a Leroy Tinnes patent application, Automatic Pipe Welding Apparatus, Ser. No. 345,539, filed in the United States Patent Office on Feb. 17, 1964, now Patent No. 3,225,171.

In certain welding operations, such as the welding of consumable insert type butt joints in ½ inch and 1 inch IPS stainless steel pipe, it is desirable first to make an initial pass around the joint to deposit welding material at the base of the notch which customarily is provided in the meeting ends of the piping prior to performing the welding operation. Subsequently, additional passes are made around the circumference of the butt joint and, in the subsequent passes, welding wire is fed to the joint to provide overlapping layers of weld material.

Although the present invention is not concerned with welding techniques, it is especially adapted for all welding operations involving the necessity of supplying welding wire as the welding pass proceeds. In prior operations of this type, it has been necessary to manually feed the wire and, obviously, such a manual operation not only is inconvenient and inefficient, but frequently over-dependent upon the close attention and skill of the operator.

The copending Leroy Tinnes Automatic Pipe Welding Apparatus discloses a machine for welding consumable insert type butt joints without the added refinement of an automatic wire feed. Briefly considered, its major parts each is formed of separable halves capable of being assembled together about a length of pipe rather than being of a pre-assembled type which must be slipped over a pipe and to be brought into welding position. Structurally, it employs a stationary housing capable of being assembled in a fixedly-supported position on the pipe, and a shaft assembly rotatably carried by the housing. The shaft assembly is formed of a ring gear driven by a pinion carried by the housing, the pinion, in turn, taking its drive from a motor-driven, flexible, elongate drive shaft. The housing provides a bearing in which the shaft is journaled and the portion of the shaft extending outwardly of the bearing mounts an electrode holder assembly. Consequently, drive imparted to the ring gear rotates the electrode of the assembly circumferentially about the pipe, the rotation carrying with it the usual power and inert gas conduits which serve the electrode. Advantages of the co-pending application reside in its unusually small size which enables its use in confined and otherwise inaccessible areas.

The present invention modifies the co-pending "Automatic Pipe Welding Apparatus" and, further, incorporates in it an automatic wire-feeding mechanism which, as will become apparent, feeds wire to the welding pass in a direct relationship with the rotational advance of the welding electrode.

A primary object of the present invention is to provide an automatic pipe welding apparatus capable of feeding welding wire at a controlled rate determined by the advance of the welding electrode.

Another object is to provide a relatively small automatic wire-feeding, pipe welding apparatus capable of being assembled about a length of pipe rather than being slipped over a free end of the pipe.

A further object is to provide apparatus of the type indicated in the foregoing objects, the apparatus being capable of being mounted on a relatively short axial length of pipe to permit use in confined areas.

Yet another object is to provide apparatus in which the welding head rotates circumferentially about a length of pipe to make the weld, the radius of rotation being relatively small to permit use in confined areas.

Other more general objects are to provide apparatus which is sturdy, inexpensive, formed of simple structural parts and capable of operating in a simple, reliable manner without requiring particular skills on the part of the operator.

Other objects will become apparent in the ensuing detailed description.

Generally considered, the invention features the use of a wire reel frame in which a wire reel normally is freely rotatable, the reel, of course, containing a coil of the welding wire to be utilized in the welding operations. The reel frame is securely carried by a stationary housing which, in turn, may be securely mounted on a short axial section of the piping to be welded. The housing further mounts a shaft assembly which, preferably, includes a ring gear mounted in the housing and driven by a pinion. An elongate flexible shaft coupled to a remotely-disposed motor drives the pinion. A portion of the shaft assembly projects outwardly of the housing and this external portion carries both an electrode holder and a so-called wire-feed scoop. Consequently, both the electrode assembly and the scoop rotate with the shaft when the pinion drives the ring gear. The wire of the reel is fed into the scoop and, since the reel is rotatably carried by its frame, rotation of the shaft also rotatably carries the reel. Consequently, there is no relative motion between the wire of the reel and the scoop so that no wire is fed through the scoop.

When it is desired to feed wire for a welding pass, the apparatus provides a means by which the reel may be bound to the frame so as to remain stationary relative to the scoop which, as mentioned, rotates with the shaft assembly. Thus, rotation of the scoop relative to the stationary wire causes the wire to be fed through the scoop and into the vicinity of the welding pass. Other particular features of the invention will become more apparent in the detailed description which is to follow.

Figure 2:
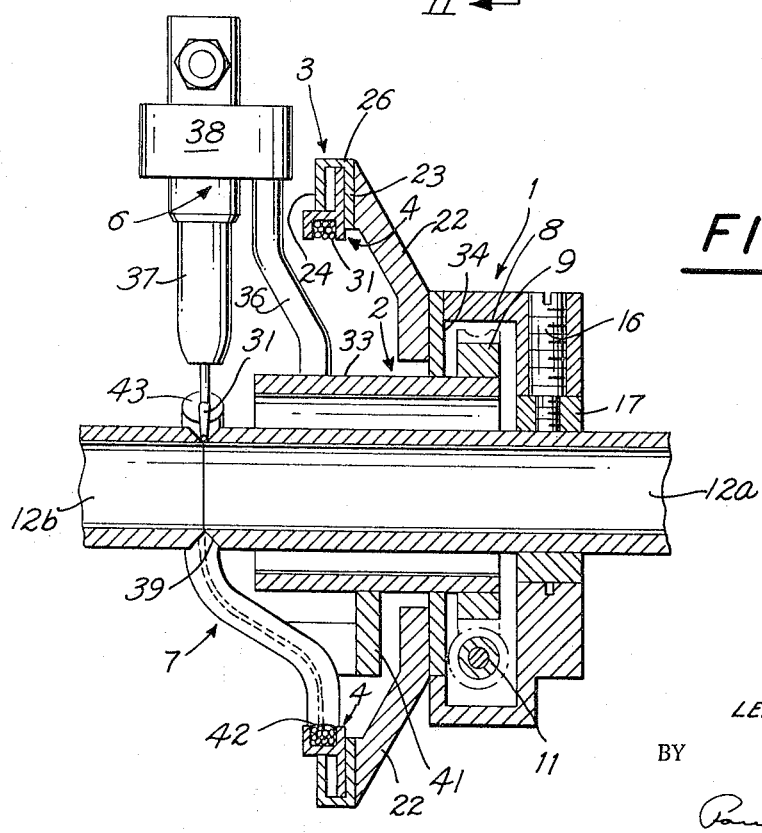
Figure 3:
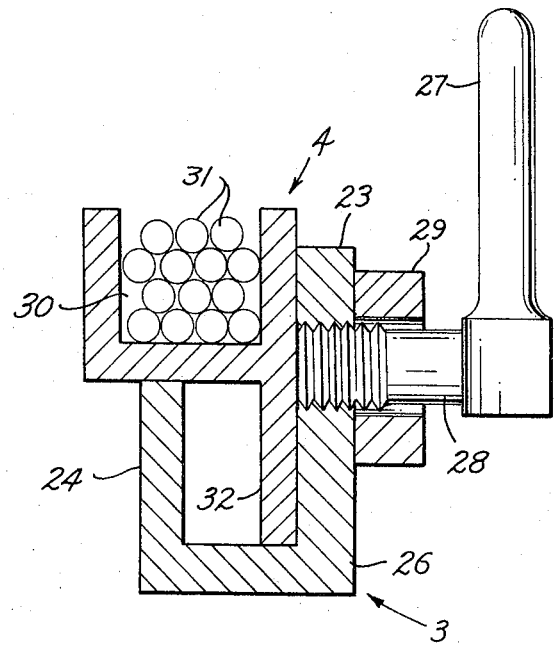
Figure 4:
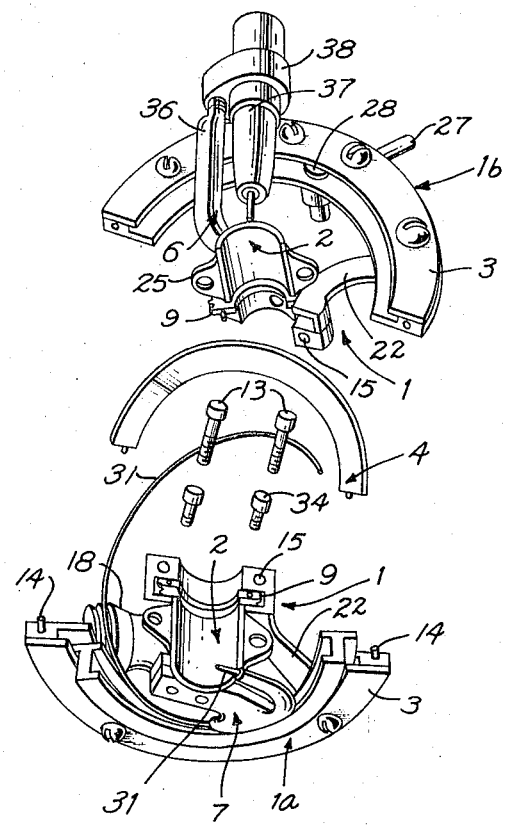

An embodiment of the invention is illustrated in the accompanying drawings of which FIG. 1 is a front end view of an assembled apparatus;

FIGS. 2 and 3 are sections along lines II—II and IV—IV of FIG. 1, the view of FIG. 2, however, showing a scoop mechanism oriented to the left rather than the right side of the FIG. 1 arrangement; and FIG. 4 is an exploded view showing the parts in a partially-assembled disposition.

Referring to the drawings and, in particular to FIGS. 2 and 4, it may be noted that the apparatus generally is formed of certain major components including a stationary housing 1, a shaft assembly 2, a wire reel frame 3, a wire reel 4 mounted within the frame, an electrode holder assembly 6 and a wire scoop 7. The physical structure and appearance of these various components best may be understood with reference to FIG. 4, while FIG. 2 shows the manner in which they fit together when assembled.

It will be noted in FIG. 2 that housing 1 has a cylindrical-shaped rear portion formed interiorly with an enlarged recess 8 in which is mounted a ring gear 9 driven by a pinion 11. As already noted, this housing component is formed of separable halves (FIG. 4) permitting it to be assembled about a piping 12a on which the weld is to be performed. The rear portion of housing 1 is adapted to closely engage pipe 12a and hold the entire apparatus in a fixed stationary position relative to the pipe. As shown in FIG. 4, the halves may be assembled by being bolted together utilizing bolts 13 as well as dowels 14 which, as may be noted, are carried by the wire reel frame portion of the housing. The bolts are received in threaded openings 15. After being assembled around the pipe, the housing may be secured to it by means of a set screw 16 (FIG. 2), and, for smaller diameter pipes, the apparatus may employ a bushing 17.

Further considering the structure of housing 1, its halves are identified by numerals 1a and 1b (FIG. 4) and half 1a carries pinion 11. More specifically, half 1a carries a flange 18 providing bearings for the pinion, the flange having a threaded end portion to which is coupled an elongate flexible drive shaft 19, which, in a manner that will be understood, is remotely driven by an appropriate power, such as an electric motor (not shown). The flexible shaft, of course, driveably engages pinion 11.

Reel frame 3 also is carried by stationary housing 1, the support being provided by a plurality of radial spokes 22 which, if desired, may be cast with the housing halves. Frame 3, as best shown in FIG. 2, has a U-shaped interior formed of legs 23 and 24, as well as a web 26.

Mounted in leg 23 of the frame is a clutch mechanism, the details of which are illustrated in FIG. 3. In particular, the mechanism includes a handle 27 secured to a shaft 28 mounted in a boss 29 which, in turn, is secured to leg 23 of the frame. The inner part of shaft 28 is threadably received within leg 23 and the thread is relatively steep-pitched so that rotation of arm 27 moves the shaft inwardly of the frame toward reel 4 which, as already noted, normally is freely rotatable therein. The throw of arm 27 is sufficient to cause shaft 28 to move the reel into a binding engagement with leg 24 of the frame.

Reel member 4 is formed with a U-shaped groove 30 in which are wound the coils of wire 31. Also, the reel has an outwardly extending leg 32 against which shaft 28 of the clutch mechanism may be brought to bear. When the clutch is thrown, reel leg 32 is moved into engagement with leg 24 of the reel frame.

Shaft assembly 2, as already noted, includes ring gear 9 by means of which it may be rotatably driven. Also, the assembly includes a shaft section proper identified in FIG. 2 by numeral 33 journaled in radial flanges 34 of the housing.

It further should be noted that, in a manner similar to housing 1, the shaft assembly 2 and wire reel 4 also are formed of separable halves capable of being assembled about a length of pipe to avoid the undesirable necessity of slipping the machine over a free pipe end. The halves of the shaft assembly are shown in exploded disposition in FIG. 4 where it will be seen they may be secured together by screws 34 received in flanges 25. The ring gear parts, most suitably, are interconnected by appropriately placed dowels.

Reel 4 also is illustrated in an exploded disposition in FIG. 4, but its lower half is shown fitted into the reel frame while its upper half is free of the frame. Wire 31 is coiled on the interior race of the reel. The halves, of course, are held together by the frame, although they also employ suitable interconnecting dowels.

A particular feature of the invention is the fact that shaft portion 33 of the assembly carries both the electrode holder assembly 6 and the scoop 7. As may be noted, holder assembly 6 is mounted on a radially and forwardly extending bracket 36 and it detachably mounts on electrode 37 by means of which the heat necessary for the welding operation is supplied. Holder 6 includes a flange 38 which, in use, would be coupled to an electric cable 40 (FIG. 1) to apply power to the electrode. If desired, the cable may be encased in a tubing which supplies inert gas for welding operations of that type.

It is to be particularly noted that the holder assembly is so mounted as to dispose electrode 37 directly over the welding zone of the piping. As shown in FIG. 2, the welding zone is the notched area 39 formed between lengths of pipe 12A and 12B. In conducting what is known as the consumable insert type butt joint weld for stainless steel pipe, it is customary first to fill the base of notch 39 with a welding material and, during this particular operation, the welding wire is not utilized. Instead, pinion 11 is driven to rotate ring gear 9, as well as the entire shaft assembly, to carry the electrode circumferentially about notch 39 to deposit weld material in the notch. During this pass, reel 4 freely rotates within its frame and no wire is fed.

Scoop 7, which also is carried by the rotatable shaft assembly, is mounted on a special radial flange 41 (FIG. 2) carried by shaft portion 33. Most suitably, the scoop is formed with a flared inlet end 42 (FIG. 1) into which a length of the wire may be fed and the body portion of the scoop extends radially inwardly and somewhat forwardly to dispose its outlet end 43 in close proximity to the lower tip of electrode 37. During the initial welding operation, in which it is not desired to feed wire, reel 4 is loosely carried by frame 3 so that it rotates. Its rotation results from the fact that scoop 7, which is rotatably driven by the ring gear, exerts pressure against the length of wire which is contains.

When it is desired to feed the wire to the welding zone, reel 4 is bound to frame 3 by throwing handle 27 of the clutch mechanism to press its leg 32 against leg 24 of the frame. When so bound, the reel, of course, cannot rotate although scoop 7 still is rotated by the driven shaft assembly. Consequently, the scoop moves relative to the wire and feeds wire through its outlet end into the welding zone. Of particular importance, the feed of the wire is in direct proportion to the rotation of electrode 27 which also is carried by shaft 33 of the shaft assembly.

It is believed that the foregoing description is entirely sufficient to enable a full understanding of the invention. The machine, of course, first must be assembled on a section of the piping to be welded. Assembly may be accomplished by inserting the ring gear halves into the separated halves of the frame. The reel then has each of its halves fitted into the separated halves of the reel frame. The separated halves next are brought together by mating the doweling, and screws 13 and 34 tightened to secure the assembly. After the machine has been properly oriented with respect to the work, set screw 16 can be tightened to clamp the assembly in a stationary, pipe-supported disposition. Preferably, electrode 37 is adjustably mounted in its holder so that the distance of its tip from the work can be closely set.

The wire, of course, must be fed into the scoop to permit the desired feed, and, in use, control of the wire feed is achieved by manipulating clutch handle 27 in the manner already described.

Advantages of the invention, aside from the controlled wire feed, lie in the relatively small size of the apparatus. In particular, a machine made in accordance with the present teachings requires only about 3½ inches of radial clearance for operation and it may be made even smaller if so desired. Also, the axial length of the machine is relatively short so that it can be mounted on only about 3½ inches of straight pipe.

Obviously many modifications and variations of the present invention are possible in the light of the above teachings. It is therefore to be understood that within the scope of the appended claims the invention may be practiced otherwise than as specifically described.

What is claimed is:
1. Wire-feeding pipe welding apparatus comprising:
   a stationary housing adapted to be mounted on and fixedly supported by said pipe, a driven shaft assembly rotatably journaled in and projected outwardly of said housing,
means carried by said housing for rotatably driving said shaft,
a wire reel,
a reel frame fixedly carried by said housing,
a welding electrode assembly carried by and rotatable with said shaft assembly,
a wire scoop also carried by and rotatable with the shaft assembly,
said electrode assembly including an electrode disposed adjacent to said reel frame and adapted to be disposed over the pipe section to be welded when the housing is mounted on the pipe,
said scoop having a wire inlet end disposed adjacent said wire reel and an outlet end disposed adjacent to said electrode,
said wire reel being loosely mounted in said frame for rotation relative thereto, and
means for binding together the reel and the frame whereupon rotation of the scoop relative to said bound reel feeds wire through the scoop outlet to the pipe section to be welded,
said binding means being releasable whereupon said wire reel rotates with the scoop to avoid wire feed.

2. The apparatus of claim 1 wherein:
said shaft assembly includes a ring gear mounted in said housing, and
said driving means includes a pinion mounted in said housing and a remotely driven elongate flexible drive shaft operatively coupled to said pinion.

3. The apparatus of claim 2 wherein said welding electrode assembly includes an electrode holder flange carried by the shaft portion of said shaft assembly,
said scoop being secured to the opposite side of said shaft portion from said holder flange.

4. The apparatus of claim 3 wherein said reel binding means includes a manually rotatable arm mounted in said reel frame and provided with a portion extending through the frame into proximity with said reel,
the mounting of the arm being so arranged that arm rotation moves said extension portion into contact with said reel for binding the reel and its frame.

5. The apparatus of claim 1 wherein said housing, shaft assembly, wire reel, and reel frame each is formed of complementary halves adapted to be assembled around the pipe.

6. The apparatus of claim 2 wherein said housing, shaft assembly and it ring gear, wire reel, and reel frame each is formed of complementary halves adapted to be assembled around the pipe.

References Cited by the Examiner

UNITED STATES PATENTS

| | | | |
|---|---|---|---|
| 2,206,549 | 7/1940 | McIntosh et al. | 219—82 |
| 2,223,005 | 11/1940 | Kerber | 242—54 X |
| 2,263,038 | 11/1941 | Heim | 219—82 |
| 2,914,653 | 11/1959 | Ernst | 219—125 |
| 2,985,746 | 5/1961 | Harmes | 219—125 |
| 3,035,147 | 5/1962 | Latter | 219—60 |
| 3,042,787 | 7/1962 | Kotecki | 219—60 |
| 3,144,544 | 8/1964 | Kurtz | 219—130 |

JOSEPH V. TRUHE, *Primary Examiner.*